United States Patent
Huang et al.

(10) Patent No.: US 8,484,639 B2
(45) Date of Patent: Jul. 9, 2013

(54) FINE-GRAINED CLOUD MANAGEMENT CONTROL USING NESTED VIRTUALIZATION

(75) Inventors: Hai Huang, White Plains, NY (US); Yaoping Ruan, White Plains, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 13/080,015

(22) Filed: Apr. 5, 2011

(65) Prior Publication Data

US 2012/0260247 A1 Oct. 11, 2012

(51) Int. Cl.
G06F 9/455 (2006.01)
G06F 15/16 (2006.01)
G06F 15/173 (2006.01)

(52) U.S. Cl.
USPC ............... 718/1; 709/201; 709/203; 709/223; 709/224; 709/226

(58) Field of Classification Search
None
See application file for complete search history.

(56) References Cited

U.S. PATENT DOCUMENTS

| | | | |
|---|---|---|---|
| 4,253,145 A * | 2/1981 | Goldberg | 703/21 |
| 2007/0028238 A1* | 2/2007 | Bennett et al. | 718/1 |
| 2011/0047544 A1* | 2/2011 | Yehuda et al. | 718/1 |
| 2011/0072428 A1* | 3/2011 | Day et al. | 718/1 |
| 2011/0075664 A1* | 3/2011 | Lambeth et al. | 370/390 |
| 2011/0153727 A1* | 6/2011 | Li | 709/203 |
| 2011/0307889 A1* | 12/2011 | Moriki et al. | 718/1 |
| 2012/0167080 A1* | 6/2012 | Vilayannur et al. | 718/1 |

OTHER PUBLICATIONS

Cully et al., "Remus: High Availability via Asynchronous Virtual Machine Replication", In Proc. of USENIS NSDI, San Francisco, CA, Apr. 2008, pp. 161-174.
Dunlap et al., "ReVirt: Enabling Intrusion Analysis through Virtual-Machine Logging and Replay", In Proc. of USENIS OSDI, Boston, MA, Dec. 2002, pp. 1-14.
Williams et al., "Overdriver: Handling Memory Overload in an Oversubscribed Cloud", In Proc. of ACM VEE, Newport Beach, CA, Mar. 2011, pp. 1-12.
Bershad et al., "Extensibility, Safety and Performance in the SPIN Operating System", In Proc. of ACM SOSP, Copper Mountain, CO, Dec. 1995, pp. 1-17.
Engler et al., "Exokernel: An Operating System Architecture for Application-Level Resource Management", In Proc. Of ACM SOSP, Copper Mountain, CO, Dec. 1995, pp. 1-16.
Seltzer et al., "Dealing With Disaster: Surviving Misbehaved Kernel Extensions", In Proc. of USENIX OSDI, Seattle, WA, Oct. 1996, pp. 1-16.

* cited by examiner

*Primary Examiner* — Emerson Puente
*Assistant Examiner* — Charles Swift
(74) *Attorney, Agent, or Firm* — Yee & Associates, P.C.; Louis J. Percello

(57) ABSTRACT

A computer implemented method, a computer program product and a data processing system allocate resources within a computing organization. A hypervisor layer is implemented on an underlying hardware. The hypervisor layer comprises a set of virtual machines. A first pseudo-hypervisor layer is then implemented within a first one of the set of virtual machines of the hypervisor layer. The first pseudo-hypervisor layer comprises a second set of virtual machines. A first software component is located within a first virtual machine of the second set of virtual machines of the first pseudo-hypervisor layer. A second software component is collocated within a second virtual machine of the second set of virtual machines of the first pseudo-hypervisor layer.

15 Claims, 9 Drawing Sheets

US 8,484,639 B2

FINE-GRAINED CLOUD MANAGEMENT CONTROL USING NESTED VIRTUALIZATION

BACKGROUND

1. Field

The disclosure relates generally to a data processing system, a computer implemented method, and a computer program product. More specifically, the disclosure relates to a data processing system, a computer implemented method, and a computer program product for fine-grained cloud management control using nested virtualization.

2. Description of the Related Art

Cloud computing is a model of service delivery for enabling convenient, on-demand network access to a shared pool of configurable computing resources that can be rapidly provisioned and released with minimal management effort or interaction with a provider of the service. For example, cloud computing allows a consumer to obtain data processing resources, such as networks, network bandwidth, servers, processing, memory, storage, applications, virtual machines, and services as a service on a temporary basis when needed. Several vendors are currently offering various cloud services. For example, such services include infrastructure as a service, platform as a service, storage as a service, software as a service, and business process as a service cloud services. These services use vendor-specific service request, access, and consumption models.

A consumer of cloud computing services may have its own data processing system resources. For example, the consumer may be a business or other entity. The consumer may have invested in its own data processing system resources. These resources may include a computer network. The consumer's computer network provides a limited amount of processing capability and data storage resources. The consumer's computer network also provides specific data processing applications. The consumer's computer network may be located on-premise and may be operated as a private cloud.

At certain times, the consumer may require data processing resources beyond those available in its computer network. For example, at certain times, the demand for data processing resources may outstrip the capability of the consumer's computer network. At these times, the response time of the consumer's computer network for some applications may increase to unacceptable levels. At other times, the consumer may require data processing applications that are not available on the consumer's own computer network. For example, the consumer may require, at times, the use of data processing applications that are not part of the consumer's core competency.

At those times when the consumer requires data processing resources beyond its own, the consumer may purchase such resources as a service on a temporary basis from a provider of cloud computing services. For example, the consumer may obtain additional processing or storage resources or specific application functionality as a service on a temporary basis from the cloud computing provider's data processing resources. Different types of service offerings may provide parts of the solution used in processing the consumer's workload. The provider's available data processing resources is known as a public cloud.

The consumer typically continues to operate its own computer network while some data processing resources are being obtained from a public cloud. Thus, data processing resources from the public cloud typically are obtained in order to supplement the data processing resources of the consumer's own private cloud at certain times of need. The simultaneous and coordinated operation of data processing resources from multiple clouds may be referred to as hybrid cloud computing. For example, operation of the consumer's private cloud along with resources obtained from one or more public clouds is a specific example of hybrid cloud computing.

SUMMARY

According to one embodiment of the present invention, a computer implemented method, a computer program product and a data processing system are provided for allocating resources within a computing organization. A hypervisor layer is implemented on an underlying hardware. The hypervisor layer comprises a set of virtual machines. A first pseudo-hypervisor layer is then implemented within a first one of the set of virtual machines of the hypervisor layer. The first pseudo-hypervisor layer comprises a second set of virtual machines. A first software component is located within a first virtual machine of the second set of virtual machines of the first pseudo-hypervisor layer. A second software component is collocated within a second virtual machine of the second set of virtual machines of the first pseudo-hypervisor layer.

DETAILED DESCRIPTION

Figure 1:
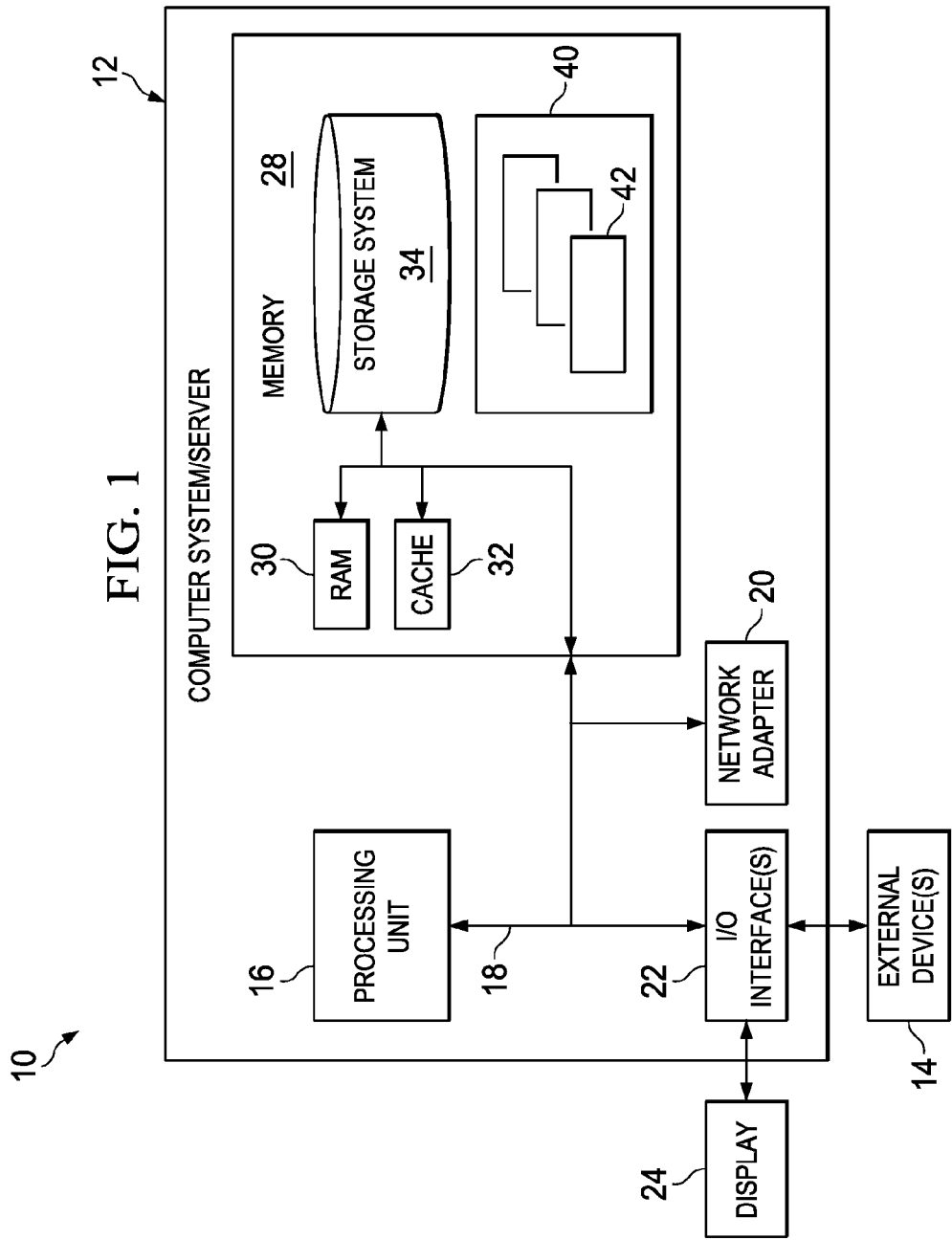
FIG. 1 is an illustration of a cloud computing node in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, the illustrative embodiments are capable of being implemented in conjunction with any other type of computing environment now known or later developed.

For convenience, the detailed description includes the following definitions which have been derived from the "Draft NIST Working Definition of Cloud Computing" by Peter Mell and Tim Grance, dated Oct. 7, 2009, which is cited in an IDS filed herewith and a copy of which is attached thereto.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (e.g., private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, an illustration of a schematic of an example of a cloud computing node is depicted in accordance with an illustrative embodiment. Cloud computing node 10 is only one example of a suitable cloud computing node and is not intended to suggest any limitation as to the scope of use or functionality of the illustrative embodiments described herein. Regardless, cloud computing node 10 is capable of being implemented and/or performing any of the functionality set forth hereinabove.

In cloud computing node 10, there is a computer system/server 12 which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system/server 12 may be described in the general context of computer system-executable instructions, such as program modules being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processor unit 16, system memory 28, and bus 18 that couples various system components including system memory 28 to processor unit 16.

Processor unit 16 executes instructions for software that may be loaded into system memory 28. Processor unit 16 may be a number of processors, a multi-processor core, or some other type of processor, depending on the particular implementation. A number, as used herein with reference to an item, means one or more items. Further, processor unit 16 may be implemented using a number of heterogeneous processor systems in which a main processor is present with secondary processors on a single chip. As another illustrative example, processor unit 16 may be a symmetric multi-processor system containing multiple processors of the same type.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile media, non-volatile media, removable media, and non-removable media.

System memory 28 can include computer system readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of the illustrative embodiments as described herein.

Program/utility 40, having a set (at least one) of program modules 42, may be stored in system memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of the illustrative embodiments as described herein.

Computer system/server 12 may also communicate with one or more external devices 14, such as a keyboard, a pointing device, display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to, microcode, device drivers, redundant processing units, external disk drive arrays, RAID systems, tape drives, and data archival storage systems, etc.

Figure 2:
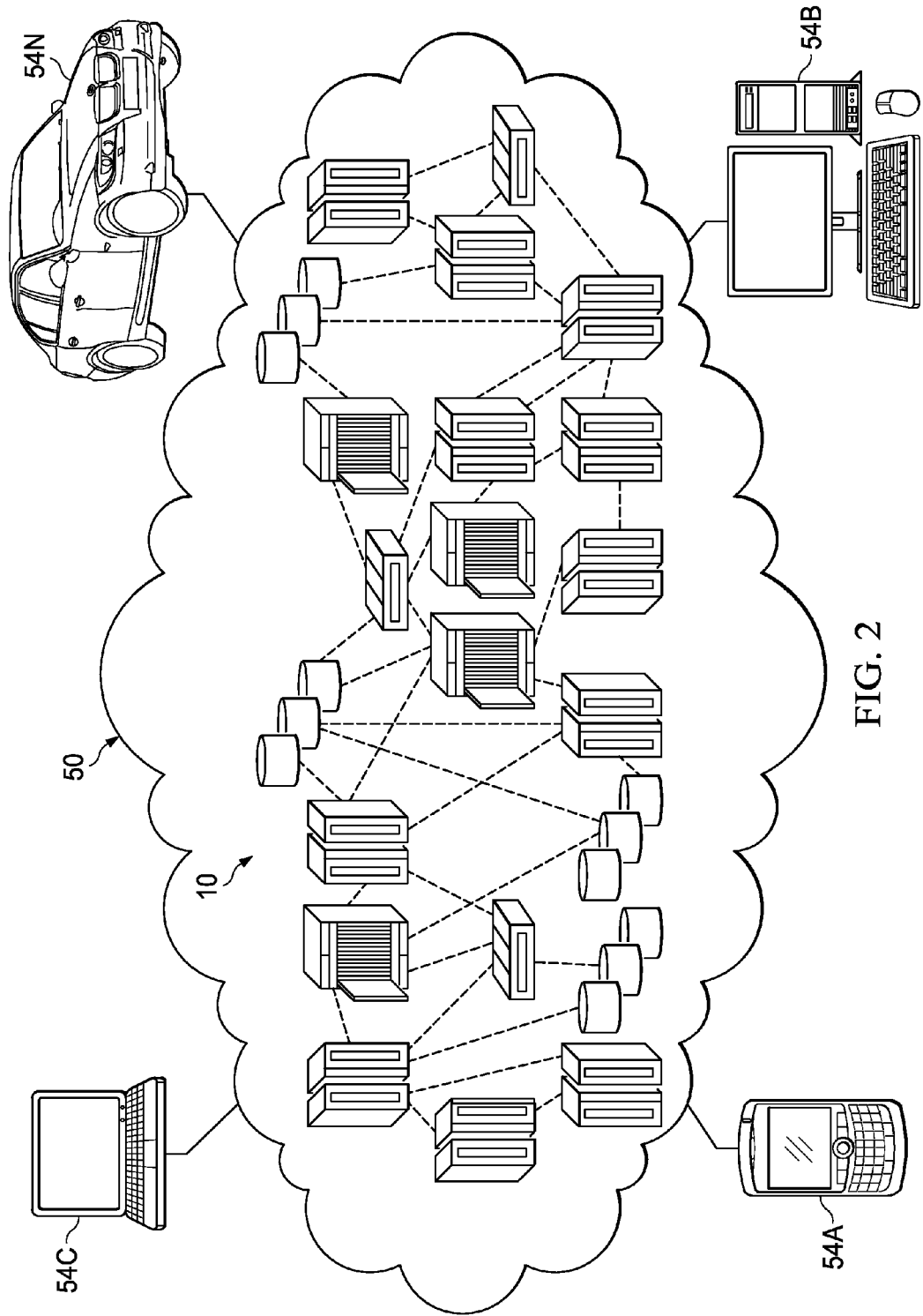
FIG. 2 is an illustration of a cloud computing environment in accordance with an illustrative embodiment.

Referring now to FIG. 2, an illustration of a cloud computing environment is depicted in accordance with an illustrative embodiment. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N, shown in FIG. 2, are intended to be illustrative only and that computing nodes 10 and cloud computing environment 50 can communicate with any type of computerized device over any type of network and/or network addressable connection (e.g., using a web browser). Program code located on one of nodes 10 may be stored on a computer recordable storage medium in one of nodes 10 and downloaded to a computing device within computing devices 54A-54N over a network for use in these computing devices. For example, a server computer in computing nodes 10 may store program code on a computer readable storage medium on the server computer. The server computer may download the program code to a client computer in computing devices 54A-54N for use on the client computer.

Figure 3:
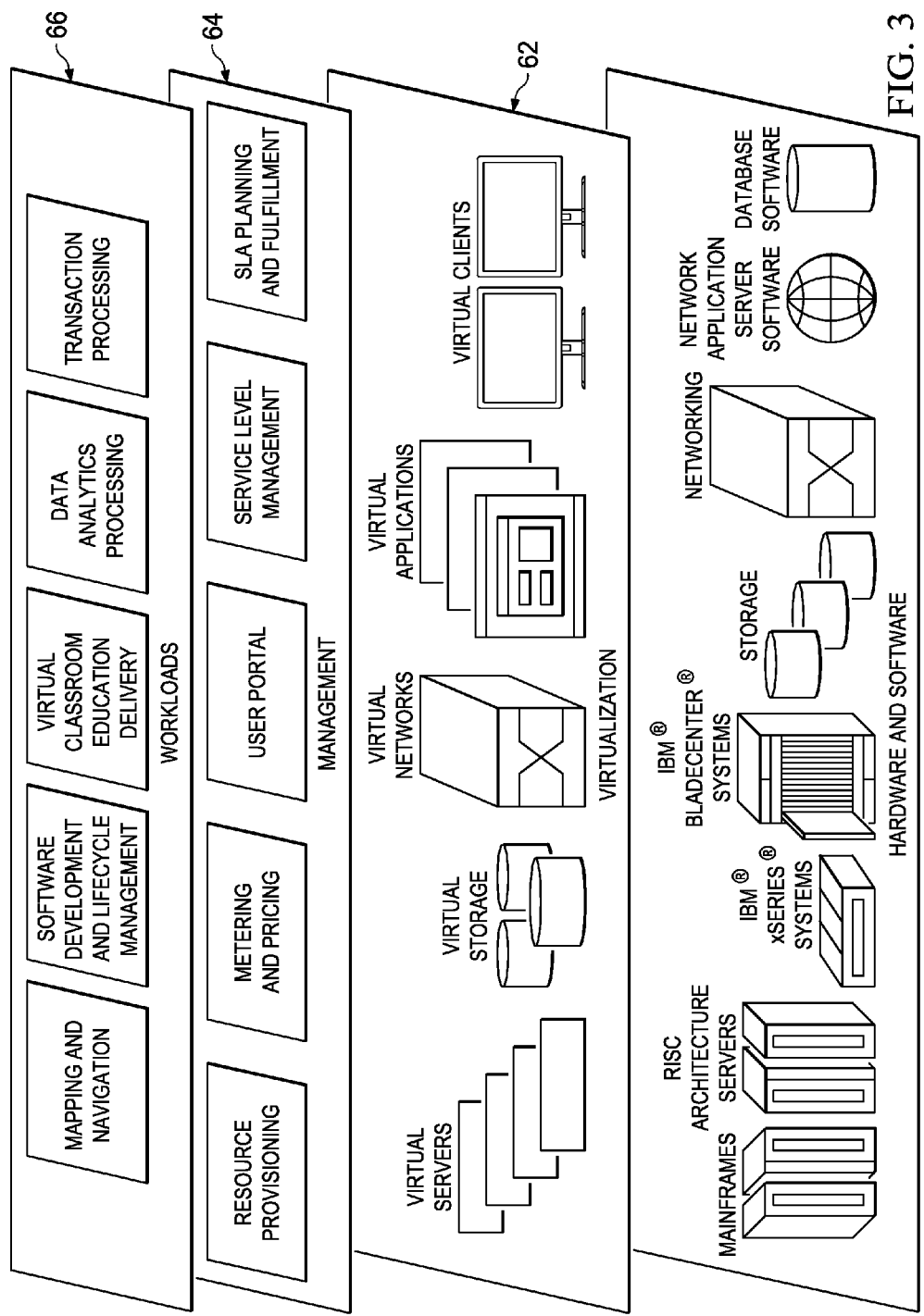
FIG. 3 is an illustration of a set of functional abstraction layers in accordance with an illustrative embodiment.

Referring now to FIG. 3, an illustration of a set of functional abstraction layers provided by cloud computing environment 50 (FIG. 2) is depicted in accordance with an illustrative embodiment. It should be understood in advance that the components, layers, and functions shown in FIG. 3 are intended to be illustrative only, and the embodiments described herein are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and resource management processing.

A virtual machine (VM) is a software implementation of a machine (i.e., a computer) that executes programs like a physical machine. Virtual machines allow the sharing of underlying physical machine resources between different virtual machines, each running its own operating system. Virtual machines can be implemented in virtualization layer 62 or in still other embodiments possibly hardware and software layer 60 or management layer 64.

A partition management firmware, also known as a hypervisor or virtual machine monitor, runs on virtualization layer 62. The partition management firmware is software that provides virtualization to the logical partitioned platform by creating and enforcing the partitioning of logical partitioned platform.

Figure 4:
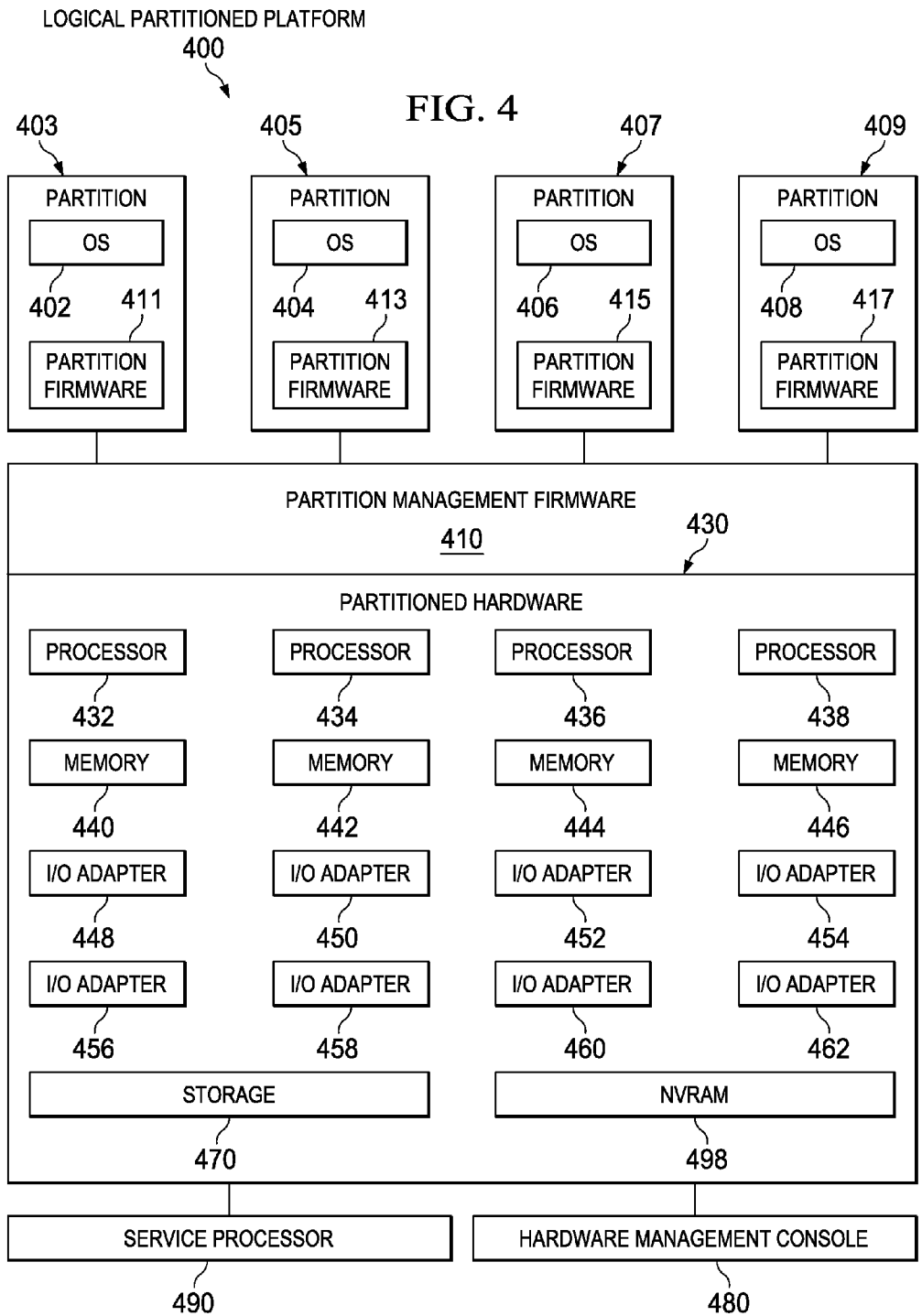
FIG. 4 is an illustration of a block diagram of an exemplary logical partitioned platform in which illustrative embodiments may be implemented.

With reference now to FIG. 4, an illustration of a block diagram of an exemplary logical partitioned platform is depicted in which illustrative embodiments may be implemented. The hardware in logical partitioned platform 400 may be implemented on, for example, computer system/server 12 in cloud computing node 10 of FIG. 1. Logical partitioned platform 400 includes partitioned hardware 430, operating systems 402, 404, 406, 408, and partition management firmware 410. Operating systems 402, 404, 406, and 408 may be multiple copies of a single operating system or multiple heterogeneous operating systems simultaneously run on logical partitioned platform 400. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux may be used, depending on the particular implementation. Operating systems 402, 404, 406, and 408 are located in partitions 403, 405, 407, and 409. Hypervisor software is an example of software that may be used to implement partition management firmware 410 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Additionally, these partitions also include partition firmware 411, 413, 415, and 417. Partition firmware 411, 413, 415, and 417 may be implemented using initial boot strap code, IEEE-1275 Standard Open Firmware, and runtime abstraction software (RTAS), which is available from International Business Machines Corporation. When partitions 403, 405, 407, and 409 are instantiated, a copy of boot strap code is loaded onto partitions 403, 405, 407, and 409 by partition management firmware 410. Thereafter, control is transferred to the boot strap code with the boot strap code then loading the open firmware and RTAS. The processors associated or assigned to the partitions are then dispatched to the partition's memory to execute the partition firmware.

Partitioned hardware 430 includes processors 432, 434, 436, and 438, memories 440, 442, 444, and 446, input/output (I/O) adapters 448, 450, 452, 454, 456, 458, 460, and 462, and a storage unit 470. Each of processors 432, 434, 436, and 438, memories 440, 442, 444, and 446, NVRAM storage 498, and I/O adapters 448, 450, 452, 454, 456, 458, 460, and 462 may be assigned to one of multiple partitions within logical partitioned platform 400, each of which corresponds to one of operating systems 402, 404, 406, and 408.

Partition management firmware 410 performs a number of functions and services for partitions 403, 405, 407, and 409 to create and enforce the partitioning of logical partitioned platform 400. Partition management firmware 410 is a firmware implemented virtual machine identical to the underlying hardware. Thus, partition management firmware 410 allows the simultaneous execution of independent OS images 402, 404, 406, and 408 by virtualizing all the hardware resources of logical partitioned platform 400.

Service processor 490 may be used to provide various services, such as processing of platform errors in the partitions. These services also may act as a service agent to report errors back to a vendor, such as International Business Machines Corporation. Operations of the different partitions may be controlled through a hardware management console, such as hardware management console 480. Hardware management console 480 is a separate data processing system from which a system administrator may perform various functions including reallocation of resources to different partitions.

Illustrative embodiments of the present invention provide a computer implemented method, computer system, and computer program product for allocating resources within a computing organization. A hypervisor layer is implemented on an underlying hardware. The hypervisor layer comprises a set of virtual machines. A first pseudo-hypervisor layer is then implemented within a first one of the set of virtual machines of the hypervisor layer. The first pseudo-hypervisor layer comprises a second set of virtual machines. A first software component is located within a first virtual machine of the second set of virtual machines of the first pseudo-hypervisor layer. A second software component is collocated within a second virtual machine of the second set of virtual machines of the first pseudo-hypervisor layer.

Figure 5:
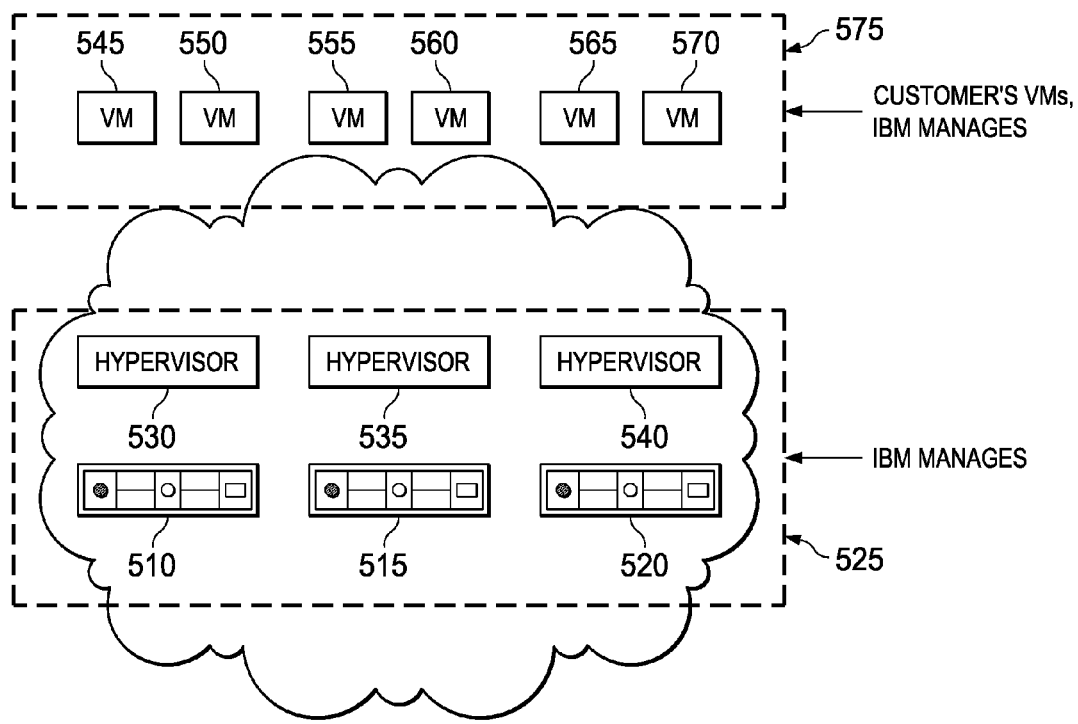
FIG. 5 is an illustration of a high level schematic of a cloud computing organization in accordance with an illustrative embodiment.

Referring now to FIG. 5, an illustration of a high level schematic of a cloud computing organization is depicted in accordance with an illustrative embodiment. Cloud 500 can be implemented on a logical partitioned platform, such as logical partitioned platform 400 of FIG. 4.

Cloud 500 includes hardware 510, 515, and 520. Hardware 510, 515, and 520 is hardware resources on which virtualization software is implemented. Hardware 510, 515, and 520 is part of hardware and software layer 60 of FIG. 3. The hardware resources comprising hardware 510, 515, and 520 can include, for example, but not limited to, mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components.

Hypervisor layer 525 is software that provides virtualization to hardware 510, 515, and 520. Hypervisor layer 525 enables the sharing of hardware resources among virtual machines executing on those hardware resources. Hypervisor layer 525 enforces access restrictions between virtual machines executing on those hardware resources.

Hypervisor layer 525 is comprised of hypervisor 530 executing on hardware 510, hypervisor 535 executing on hardware 515, and hypervisor 540 executing on hardware 520. Each of hypervisors 530, 535, and 540 is a hypervisor, such as partition management firmware 410 of FIG. 4. Each of hypervisors 530, 535, and 540 can be implemented within a virtual machine in virtualization layer 62 of FIG. 3, or in still other embodiments possibly hardware and software layer 60 of FIG. 3 or management layer 64 of FIG. 3.

Virtual machines 545 and 550 are controlled by hypervisor 530 and execute on hardware 510. Virtual machines 555 and 560 are controlled by hypervisor 535 and execute on hardware 515. Virtual machines 565 and 570 are controlled by hypervisor 540 and execute on hardware 520. Each of virtual machines 545, 550, 555, 560, 565, and 570 is a software implementation of a machine that executes programs like a physical machine. Virtual machines 545 and 550 share the underlying resources of hardware 510. Virtual machines 555 and 560 share the underlying resources of hardware 515. Virtual machines 565 and 570 share the underlying resources of hardware 520. Virtual machines 545, 550, 555, 560, 565, and 570 can be implemented, for example, in virtualization layer 62 of FIG. 3. Virtual machine layer 575 is comprised of virtual machines 545, 550, 555, 560, 565, and 570.

In Platform as a Service (PaaS) and Infrastructure as a Service (IaaS) service models, a service provider of virtualization software may have limited information regarding specific hardware on which a specific virtual machine is running. For example, in a Platform as a Service (PaaS) model, the provider of virtualization software has visibility into virtual machine layer 575 and the applications executing within virtual machines 545, 550, 555, 560, 565, and 570. However, the provider of virtualization software may not have access to hypervisor layer 525 or any of hardware 510, 515, and 520. Thus, management capabilities available from the provider of virtualization software are curtailed due to the lack of visibility into the levels underlying virtual machine layer 575.

For example, some virtual machines, such as virtual machines running application servers and database servers, should be co-located on the same hardware in order to decrease input/output latency and increase bandwidth. However, because the provider of virtualization software may lack visibility into the levels underlying virtual machine layer 575, there is no way that the provider of virtualization software can guarantee that those virtual machines are indeed co-located on the same hardware.

As an additional example, live migrations can be performed in order to load balance the running virtual machines across the available hardware, such as hardware 510, 515, and 520. However, because the provider of virtualization software may lack visibility into the levels underlying virtual machine layer 575, the provider of virtualization software does not have load information for the available resources at the platform level. Effective load balancing across available hardware, such as hardware 510, 515, and 520 then becomes haphazard.

In an Infrastructure as a Service (IaaS) service model, the provider of virtualization software has visibility into virtual machine layer 575 and the applications executing within virtual machines 545, 550, 555, 560, 565, and 570. The provider of virtualization software may also have access to hypervisor layer 525 or any of hardware 510, 515, and 520. However, customizations that are provided to certain organizations on a community cloud or public cloud may require hardware resources within a datacenter to be imprecisely allocated.

For example, certain organizations my require specific virtualization software, such as for example, Kernel-based Virtual Machine (KVM), VMWare®, available from VMware, Inc., or Xen® available from Citrix Systems, Inc. In order to implement the various virtualization platforms, hardware within a datacenter, such as hardware 510, 515, and 520 have to be segregated with different virtualization platforms running on separate hardware.

Load balancing is therefore limited between systems that are running the same virtualization platform. For example, migrations can be performed in order to load balance the running of virtual machines from hardware running a KVM virtualization platform to other hardware running a KVM virtualization platform. However, migrations could not be performed between two hardware running dissimilar virtualization platforms, such as, for example, from a KVM virtualization platform to a VMWare virtualization platform.

Figure 6:
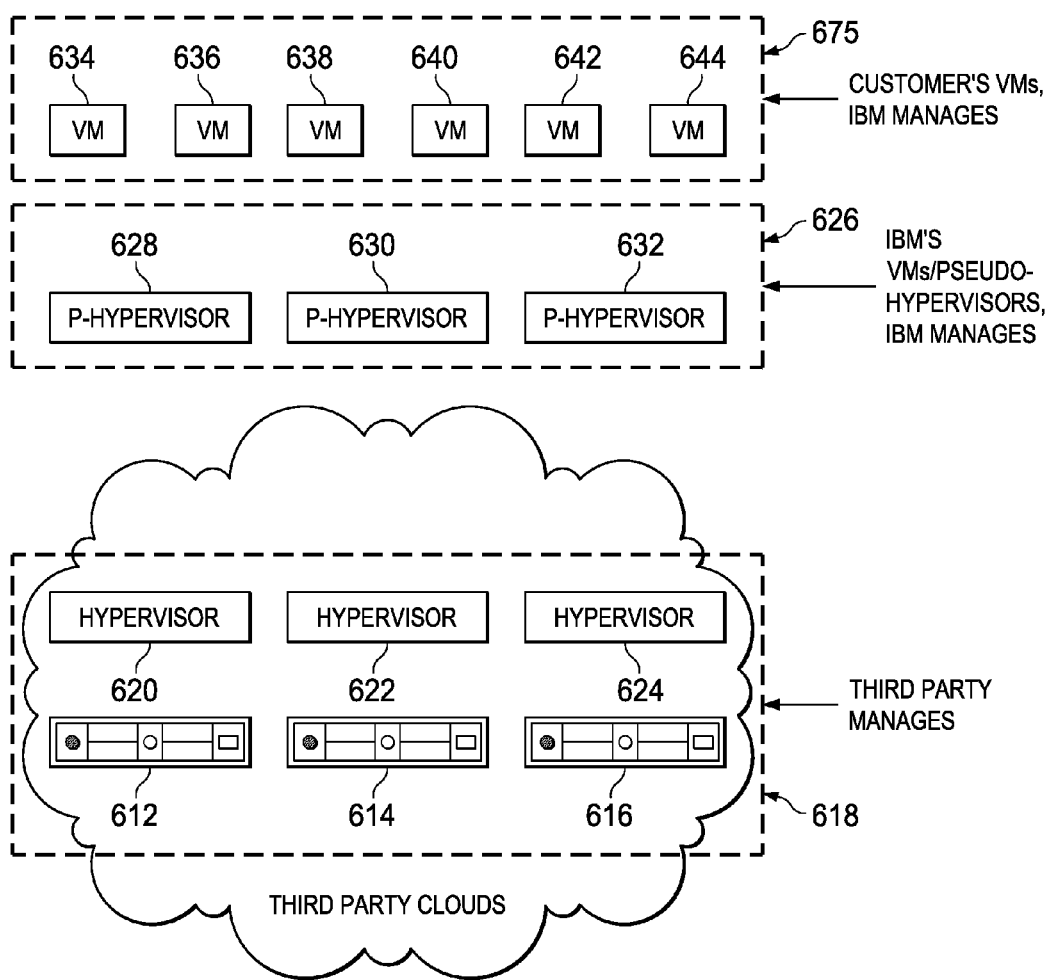
FIG. 6 is an illustration of a high level schematic of a cloud computing organization implementing a pseudo-hypervisor layer utilizing a Platform as a Service (PaaS) in accordance with an illustrative embodiment.

Referring now to FIG. 6, an illustration of a high level schematic of a cloud computing organization implementing a pseudo-hypervisor layer utilizing a Platform as a Service (PaaS) is depicted in accordance with an illustrative embodiment. Cloud 600 can be implemented on a logical partitioned platform, such as logical partitioned platform 400 of FIG. 4. Cloud 600 can be implemented, for example, as a private cloud wherein the underlying hardware is not managed by the provider of virtualization software.

Cloud 600 includes hardware 612, 614, and 616. Hardware 612, 614, and 616 can be, for example, hardware 510, 515, and 520 of FIG. 5.

Hypervisor layer 618 is software that provides virtualization to hardware 612, 614, and 616. Hypervisor layer 618 can be, for example, hypervisor layer 525 of FIG. 5. Hypervisor layer 618 is comprised of hypervisor 620 executing on hardware 612, hypervisor 622 executing on hardware 614, and hypervisor 624 executing on hardware 616.

Pseudo-hypervisor layer 626 is a software layer than provides an additional nested virtualization layer within hypervisor layer 618. Pseudo-hypervisor layer 626 includes pseudo-hypervisor 628, pseudo-hypervisor 630, and pseudo-hypervisor 632. Each of pseudo-hypervisors 628, 630, and 632 is a hypervisor, such as partition management firmware 410 of FIG. 4 executing within a virtual machine controlled by hypervisor layer 618. Pseudo-hypervisor 628 executes within a virtual machine controlled by hypervisor 620 executing on hardware 612. Pseudo-hypervisor 630 executes within a virtual machine controlled by hypervisor 622 executing on hardware 614. Pseudo-hypervisor 632 executes within a virtual machine controlled by hypervisor 624 executing on hardware 616. Because each of pseudo-hypervisors 628, 630, and 632 execute on a common hypervisor, in this example, hypervisor 620, each of pseudo-hypervisors 628, 630, and 632 is ensured of executing on a common hardware, in this example hardware 612.

Virtual machines 634 and 636 execute on hardware 612. Virtual machines 638 and 640 execute on hardware 614. Virtual machines 642 and 644 execute on hardware 616. Each of virtual machines 634, 636, 638, 640, 642, and 644 is a software implementation of a machine that executes programs like a physical machine. Virtual machines 634 and 636 are controlled by pseudo-hypervisor 628 and share the underlying resources of hardware 612. Virtual machines 638 and 640 are controlled by pseudo-hypervisor 630 and share the underlying resources of hardware 614. Virtual machines 642 and 644 are controlled by pseudo-hypervisor 632 and share the underlying resources of hardware 616. Virtual machines 634, 636, 638, 640, 642, and 644 can be implemented, for example, in virtualization layer 62 of FIG. 3.

By installing pseudo-hypervisor layer 626, the provider of virtualization software is able to effectuate management capabilities unavailable with a single level of virtualization due to the lack of visibility into the levels underlying virtual machine layer 675. Pseudo-hypervisor layer 626 is visible to and is managed by the provider of virtualization software. Therefore, the provider of virtualization software can provision or migrate virtual machines 634, 636, 638, 640, 642, and 644 among pseudo-hypervisors 628, 630, and 632. By migrating applications to virtual machines controlled by a common one of pseudo-hypervisors 628, 630, and 632, the provider of virtualization can ensure that applications are co-located on the same underlying hardware. Ensuring that applications are co-located on the same underlying hardware decreases input/output latency and increases bandwidth.

Figure 7:
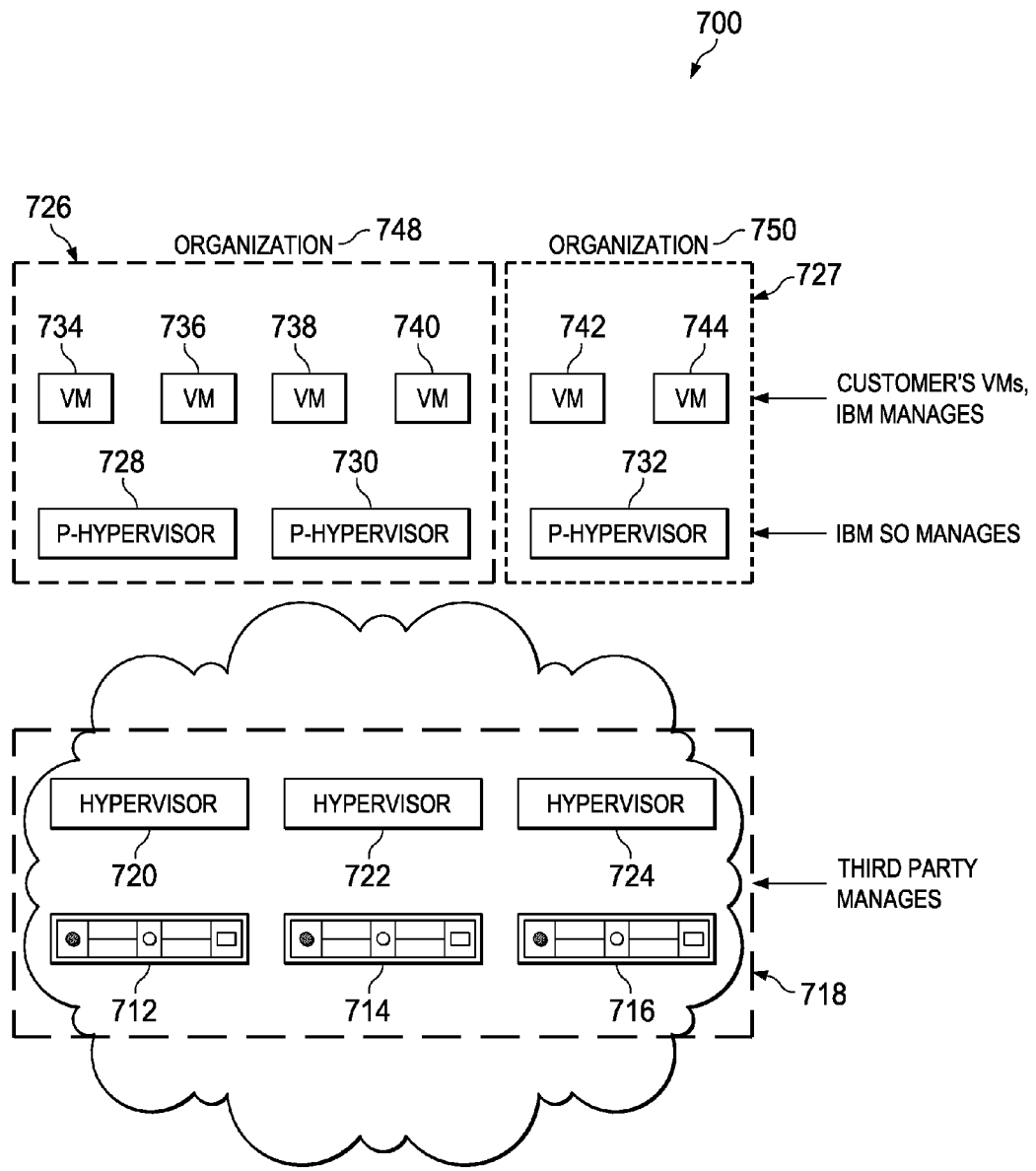
FIG. 7 is an illustration of a high level schematic of a cloud computing organization implementing a pseudo-hypervisor layer utilizing an Infrastructure as a Service (IaaS) in accordance with an illustrative embodiment.

Referring now to FIG. 7, an illustration of a high level schematic of a cloud computing organization implementing a pseudo-hypervisor layer utilizing an Infrastructure as a Service (IaaS) is depicted in accordance with an illustrative embodiment. Cloud 700 can be implemented on a logical partitioned platform, such as logical partitioned platform 400 of FIG. 4. Cloud 700 can be implemented, for example, as a community cloud or a public cloud wherein the underlying hardware is managed by the provider of virtualization software but several organizations may share a single cloud.

Cloud 700 includes hardware 712, 714, and 716. Hardware 712, 714, and 716 can be, for example, hardware 510, 515, and 520 of FIG. 5.

Hypervisor layer 718 is software that provides virtualization to hardware 712, 714, and 716. Hypervisor layer 718 can be, for example, hypervisor layer 525 of FIG. 5. Hypervisor layer 718 is comprised of hypervisor 720 executing on hardware 712, hypervisor 722 executing on hardware 714, and hypervisor 724 executing on hardware 716.

In a community cloud or public cloud, the cloud is shared between two or more organizations. Organization 748 and organization 750 share resources of cloud 700.

Pseudo-hypervisor layer 726 and pseudo-hypervisor layer 727 are software layers that provide an additional nested virtualization layer within hypervisor layer 718. Pseudo-hypervisor layer 726 is assigned to organization 748. Pseudo-hypervisor layer 726 includes pseudo-hypervisor 728 and pseudo-hypervisor 730. Pseudo-hypervisor layer 727 is assigned to organization 750. Pseudo-hypervisor layer 727 includes pseudo-hypervisor 732. Each of pseudo-hypervisors 728, 730, and 732 is a hypervisor, such as partition management firmware 410 of FIG. 4, executing within a virtual machine controlled by hypervisor layer 718. Pseudo-hypervisor 728 executes within a virtual machine controlled by hypervisor 720 executing on hardware 712. Pseudo-hypervisor 730 executes within a virtual machine controlled by hypervisor 722 executing on hardware 714. Pseudo-hypervisor 732 executes within a virtual machine controlled by hypervisor 724 executing on hardware 716.

Virtual machines 734 and 736 execute on hardware 712. Virtual machines 738 and 740 execute on hardware 714. Virtual machines 734, 736, 738, and 740 reside within pseudo-hypervisor layer 726 assigned to organization 748. Virtual machines 742 and 744 execute on hardware 716. Virtual machines 742 and 744 reside within pseudo-hypervisor layer 727 assigned to organization 750. Each of virtual machines 734, 736, 738, 740, 742, and 744 is a software implementation of a machine that executes programs like a physical machine. Virtual machines 734 and 736 are controlled by pseudo-hypervisor 728 and share the underlying resources of hardware 712. Virtual machines 738 and 740 are controlled by pseudo-hypervisor 730 and share the underlying resources of hardware 714. Virtual machines 742 and 744 are controlled by pseudo-hypervisor 732 and share the underlying resources of hardware 716. Virtual machines 734, 736, 738, 740, 742, and 744 can be implemented, for example, in virtualization layer 62 of FIG. 3.

By implementing separate pseudo-hypervisor layers 726 and 727, the provider of virtualization software is able to provide organization 748 and 750 with different virtualization platforms without having to segregate hardware 712, 714, and 716 within a datacenter to execute those different virtualization platforms. Because each of pseudo-hypervisors 728, 730, and 732 is running within a virtual machine of hypervisor layer 718, different virtualization platforms can be run within pseudo-hypervisor layer 726 and pseudo-hypervisor layer 727. For example, a KVM virtualization platform can be run within pseudo-hypervisor layer 726 while a VMware virtualization platform can be run within pseudo-hypervisor layer 727.

Figure 8:
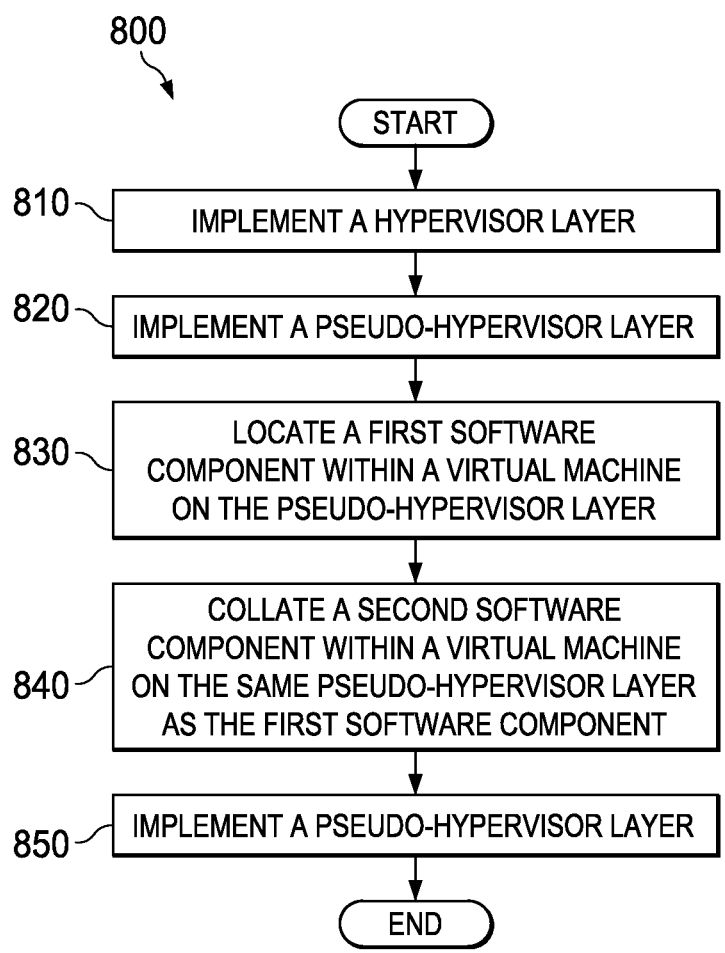
FIG. 8 is an illustration of a flowchart for co-locating applications executing within virtual machines co-located on the same hardware within Platform as a Service (PaaS) and Infrastructure as a Service (IaaS) service models in accordance with an illustrative embodiment.

Referring now to FIG. 8, an illustration of a flowchart for co-locating applications executing within virtual machines co-located on the same hardware within Platform as a Service (PaaS) and Infrastructure as a Service (IaaS) service models is depicted in accordance with an illustrative embodiment. Process 800 is a software process executed within a cloud environment, such as cloud 600 of FIG. 6.

Process 800 begins by implementing a hypervisor layer (step 810). The hypervisor layer can be for example, hypervisor layer 618 of FIG. 6. The hypervisor layer is software that provides virtualization to underlying hardware, such as hardware 612, 614, and 616 of FIG. 6. The hypervisor layer includes at least one virtual machine.

Process 800 then implements a pseudo-hypervisor layer (step 820). The pseudo-hypervisor layer is implemented within a virtual machine of the hypervisor layer. The pseudo-hypervisor layer can be, for example, pseudo-hypervisor layer 626 of FIG. 6. The pseudo-hypervisor layer is a software layer than provides an additional nested virtualization layer within the hypervisor layer, such as hypervisor layer 618 of FIG. 6.

Process 800 then locates a first software component within a virtual machine on the pseudo-hypervisor layer (step 830). Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The first software component can be located within a virtual machine on the pseudo-hypervisor layer, for example, but not limited to, by installing the first software component within the virtual machine, loading the first software component to the virtual machine, or migrating the first software component to the virtual machine.

Process 800 then collocates a second software component within a virtual machine on the same pseudo-hypervisor layer as the first software component (step 840). Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The second software component is collocated when the second software component is, for example, but not limited to, installed, loaded, or migrated to the virtual machine on the same pseudo-hypervisor layer as the first software component.

Next, process 800 implements a pseudo-hypervisor layer (step 850) with the process terminating thereafter. By implementing a pseudo-hypervisor layer, the provider of virtualization software is able to effectuate management capabilities unavailable with a single level of virtualization due to the lack of visibility into the underlying virtual machines layer. The pseudo-hypervisor layer is visible to and is managed by the provider of virtualization software. Therefore, the provider of virtualization software can provision or migrate virtual machines among pseudo-hypervisors and within a single pseudo-hypervisor. By migrating applications to virtual machines controlled by a common pseudo-hypervisor, the provider of virtualization can ensure that applications are co-located on the same underlying hardware. Ensuring that applications are co-located on the same underlying hardware decreases input/output latency and increases bandwidth.

Figure 9:
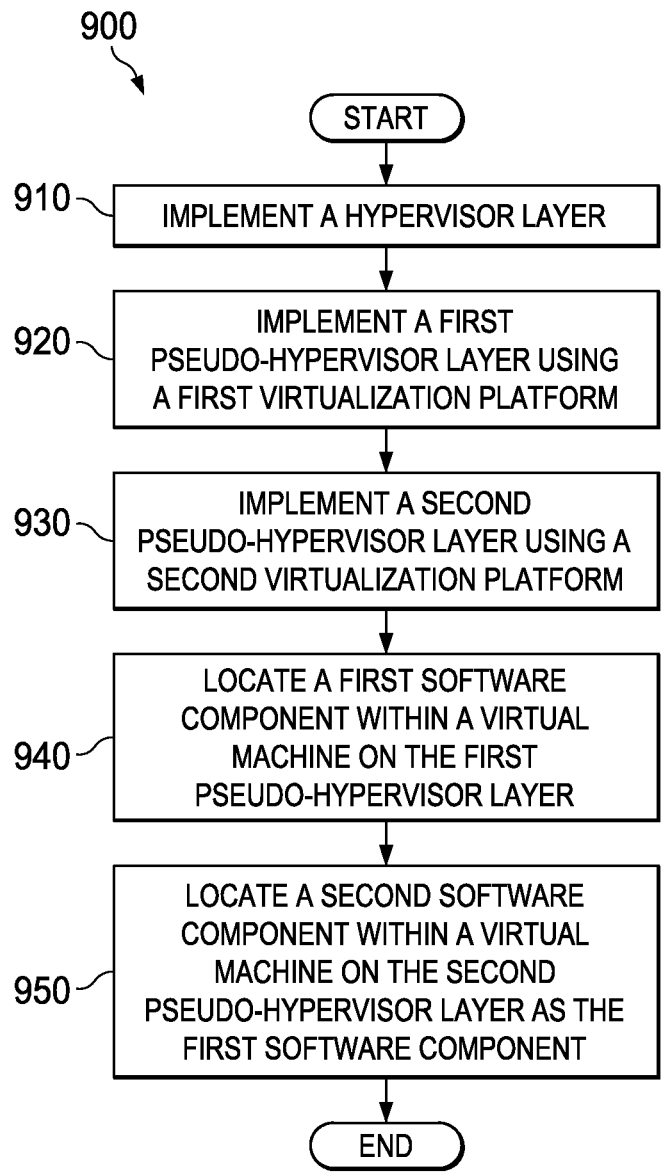
FIG. 9 is an illustration of a flowchart for co-locating different virtual machine platforms within virtual machines co-located on the same hardware within an Infrastructure as a Service (IaaS) service models in accordance with an illustrative embodiment.

Referring now to FIG. 9, an illustration of a flowchart for co-locating different virtual machine platforms within virtual machines co-located on the same hardware within an Infrastructure as a Service (IaaS) service model is depicted in accordance with an illustrative embodiment. Process 900 is a software process executed within a cloud environment, such as cloud 700 of FIG. 7.

Process 900 begins by implementing a hypervisor layer (step 910). The hypervisor layer can be, for example, hypervisor layer 718 of FIG. 7. The hypervisor layer is software that provides virtualization to underlying hardware, such as hardware 712, 714, and 716 of FIG. 7. The hypervisor layer includes at least one virtual machine.

Process 900 then implements a first pseudo-hypervisor layer using a first virtualization platform (step 920). The first pseudo-hypervisor layer is implemented within a virtual machine of the hypervisor layer. The first pseudo-hypervisor layer can be for, example, pseudo-hypervisor layer 726 of FIG. 7. The first pseudo-hypervisor layer is a software layer than provides an additional nested virtualization layer within the hypervisor layer, such as hypervisor layer 718 of FIG. 7. The first virtualization platform can be, for example, one of Kernel-based Virtual Machine (KVM), VMWare®, available from VMware, Inc., or Xen® available from Citrix Systems, Inc.

Process 900 then implements a second pseudo-hypervisor layer using a second virtualization platform (step 930). The second pseudo-hypervisor layer is implemented within a virtual machine of the hypervisor layer. The second pseudo-hypervisor layer can be, for example, pseudo-hypervisor layer 727 of FIG. 7. The second pseudo-hypervisor layer is a software layer than provides an additional nested virtualization layer within the hypervisor layer, such as hypervisor layer 718 of FIG. 7. The second virtualization platform can be, for example, one of Kernel-based Virtual Machine (KVM), VMWare®, available from VMware, Inc., or Xen® available from Citrix Systems, Inc. The second virtualization platform can be the same virtualization platform as the first virtualization platform. The second virtualization platform can be a different virtualization platform as the first virtualization platform.

Process 900 then locates a first software component within a virtual machine on the first pseudo-hypervisor layer (step 940). Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Next, process 900 locates a second software component within a virtual machine on the second pseudo-hypervisor layer as the first software component (step 950). Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

By implementing separate pseudo-hypervisor layers, the provider of virtualization software is able to effectuate management capabilities unavailable with a single level of virtualization due to the lack of visibility into the levels underlying virtual machines level. Pseudo-hypervisor layer is visible to and is managed by the provider of virtualization software. Therefore, the provider of virtualization software can implement dissimilar virtualization software, such as for example, Kernel-based Virtual Machine (KVM), VMWare®, available from VMware, Inc., or Xen® available from Citrix Systems, Inc., on a single hardware layer, without having to arbitrarily segregate hardware within a datacenter in order to run different virtualization platforms.

Thus, illustrative embodiments of the present invention provide a computer implemented method, computer system, and computer program product for allocating resources within a computing organization. A hypervisor layer is implemented on an underlying hardware. The hypervisor layer comprises a set of virtual machines. A first pseudo-hypervisor layer is then implemented within a first one of the set of virtual machines of the hypervisor layer. The first pseudo-hypervisor layer comprises a second set of virtual machines. A first software component is located within a first virtual machine of the second set of virtual machines of the first pseudo-hypervisor layer. A second software component is collocated within a second virtual machine of the second set of virtual machines of the first pseudo-hypervisor layer The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for allocating resources within a data center, the computer implemented method comprising:

implementing a hypervisor layer on an underlying hardware, the hypervisor layer comprising a set of virtual machines;

implementing a first pseudo-hypervisor layer within a first one of the set of virtual machines of the hypervisor layer on the underlying hardware, wherein the first pseudo-hypervisor layer is implemented using a first virtualization platform, the first pseudo-hypervisor layer comprising a second set of virtual machines;

locating a first software component within a first virtual machine of the second set of virtual machines of the first pseudo-hypervisor layer;

collocating a second software component within a second virtual machine of the second set of virtual machines of the first pseudo-hypervisor layer;

implementing a second pseudo-hypervisor layer within a second one of the set of virtual machines of the hypervisor layer, wherein the second pseudo-hypervisor layer is implemented using a second virtualization platform, the second virtualization platform being a different virtualization platform than the first virtualization platform, the second pseudo-hypervisor layer comprising a third set of virtual machines, wherein implementing the second pseudo-hypervisor layer within the second one of the set of virtual machines of the hypervisor layer allows the data center to implement dissimilar virtualization software on the underlying hardware without having to segregate the underlying hardware within the data center into a first hardware subset implementing the first virtualization platform and a second hardware subset implementing the second virtualization platform;

locating a third software component within a first virtual machine of the third set of virtual machines of the second pseudo-hypervisor layer; and collocating a fourth software component within a second virtual machine of the third set of virtual machines of the second pseudo-hypervisor layer.

2. The computer implemented method of claim 1, wherein input/output latency of the underlying hardware is decreased and bandwidth of the underlying hardware is increased due to collocating the first software component and the second software component in the first pseudo-hypervisor layer.

3. The computer implemented method of claim 1, wherein the steps of implementing the hypervisor layer and implementing the first pseudo-hypervisor layer further comprise:

implementing the hypervisor layer on the underlying hardware, wherein the hypervisor layer is implemented using a first virtualization platform; and implementing the first pseudo-hypervisor layer within the first one of the set of virtual machines of the hypervisor layer, wherein the first pseudo-hypervisor layer is implemented using a second virtualization platform, the second virtualization platform being a different virtualization platform than the first virtualization platform.

4. The computer implemented method of claim 3, wherein the computing organization is a cloud computing organization utilizing a Platform as a Service (PaaS) service model.

5. The computer implemented method of claim 1, wherein the computing organization is a cloud computing organization utilizing an Infrastructure as a Service (IaaS) service model.

6. A computer program product allocating resources within a computing organization, the computer program product comprising:

a computer readable storage medium;

computer readable program code configured to implement a hypervisor layer on an underlying hardware, the hypervisor layer comprising a set of virtual machines;

computer readable program code configured to implement a first pseudo-hypervisor layer within a first one of the set of virtual machines of the hypervisor layer on the underlying hardware, wherein the first pseudo-hypervisor layer is implemented using a first virtualization platform, the first pseudo-hypervisor layer comprising a second set of virtual machines;

computer readable program code configured to locate a first software component within a first virtual machine of the second set of virtual machines of the first pseudo-hypervisor layer;

computer readable program code configured to collocate a second software component within a second virtual machine of the second set of virtual machines of the first pseudo-hypervisor layer;

computer readable program code configured to implement a second pseudo-hypervisor layer within a second one of the set of virtual machines of the hypervisor layer, wherein the second pseudo-hypervisor layer is implemented using a second virtualization platform, the second virtualization platform being a different virtualization platform than the first virtualization platform, the second pseudo-hypervisor layer comprising a third set of virtual machines, wherein implementing the second pseudo-hypervisor layer within the second one of the set of virtual machines of the hypervisor layer allows the data center to implement dissimilar virtualization software on the underlying hardware without having to segregate the underlying hardware within the data center into a first hardware subset implementing the first virtualization platform and a second hardware subset implementing the second virtualization platform;

computer readable program code configured to locate a third software component within a first virtual machine of the third set of virtual machines of the second pseudo-hypervisor layer; and computer readable program code configured to collocate a fourth software component within a second virtual machine of the third set of virtual machines of the second pseudo-hypervisor layer;

wherein the computer readable program code are stored on the computer readable storage medium.

7. The computer program product of claim 6, wherein input/output latency of the underlying hardware is decreased and bandwidth of the underlying hardware is increased due to collocating the first software component and the second software component in the first pseudo-hypervisor layer.

8. The computer program product of claim 6, wherein the computer readable program code configured to implement the hypervisor layer and the computer readable program code configured to implement the first pseudo-hypervisor layer further comprise:

computer readable program code configured to implement the hypervisor layer on the underlying hardware, wherein the hypervisor layer is implemented using a first virtualization platform; and computer readable program code configured to implement the first pseudo-hypervisor layer within the first one of the set of virtual machines of the hypervisor layer, wherein the first pseudo-hypervisor layer is implemented using a second virtualization platform, the second virtualization platform being a different virtualization platform than the first virtualization platform.

9. The computer program product of claim 8, wherein the computing organization is a cloud computing organization utilizing a Platform as a Service (PaaS) service model.

10. The computer program product of claim 6, wherein the computing organization is a cloud computing organization utilizing an Infrastructure as a Service (IaaS) service model.

11. A data processing system comprising:
   a storage having a computer program product encoded thereon for allocating resources within a computing organization:
   a bus connecting the storage to a processor; and
   a processor, wherein the processor executes the computer program product: to implement a hypervisor layer on an underlying hardware, the hypervisor layer comprising a set of virtual machines;
   to implement a first pseudo-hypervisor layer within a first one of the set of virtual machines of the hypervisor layer on the underlying hardware, wherein the first pseudo-hypervisor layer is implemented using a first virtualization platform, the first pseudo-hypervisor layer comprising a second set of virtual machines;
   to locate a first software component within a first virtual machine of the second set of virtual machines of the first pseudo-hypervisor layer;
   to collocate a second software component within a second virtual machine of the second set of virtual machines of the first pseudo-hypervisor layer;
   to implement a second pseudo-hypervisor layer within a second one of the set of virtual machines of the hypervisor layer, wherein the second pseudo-hypervisor layer is implemented using a second virtualization platform, the second virtualization platform being a different virtualization platform than the first virtualization platform, the second pseudo-hypervisor layer comprising a third set of virtual machines, wherein implementing the second pseudo-hypervisor layer within the second one of the set of virtual machines of the hypervisor layer allows the data center to implement dissimilar virtualization software on the underlying hardware without having to segregate the underlying hardware within the data center into a first hardware subset implementing the first virtualization platform and a second hardware subset implementing the second virtualization platform;
   to locate a third software component within a first virtual machine of the third set of virtual machines of the second pseudo-hypervisor layer; and
   to collocate a fourth software component within a second virtual machine of the third set of virtual machines of the second pseudo-hypervisor layer.

12. The data processing system of claim 11, wherein input/output latency of the underlying hardware is decreased and bandwidth of the underlying hardware is increased due to collocating the first software component and the second software component in the first pseudo-hypervisor layer.

13. The data processing system of claim 11, wherein the processor executing the computer program product to implement the hypervisor layer and the processor executing the computer program product to implement the first pseudo-hypervisor layer further comprise the processor executing the computer program product:
   to implement the hypervisor layer on the underlying hardware, wherein the hypervisor layer is implemented using a first virtualization platform; and
   to implement the first pseudo-hypervisor layer within the first one of the set of virtual machines of the hypervisor layer, wherein the first pseudo-hypervisor layer is implemented using a second virtualization platform, the second virtualization platform being a different virtualization platform than the first virtualization platform.

14. The data processing system of claim 13, wherein the computing organization is a cloud computing organization utilizing a Platform as a Service (PaaS) service model.

15. The data processing system of claim 13, wherein the computing organization is a cloud computing organization utilizing an Infrastructure as a Service (IaaS) service model.

* * * * *